United States Patent [19]

Wenzel

[11] Patent Number: 4,591,045
[45] Date of Patent: May 27, 1986

[54] METHOD AND DEVICE FOR ALIGNING FISH

[75] Inventor: Werner Wenzel, Lübeck, Fed. Rep. of Germany

[73] Assignee: Nordischer Maschinenbau Rud. Baader GmbH & Co. KG, Lübeck, Fed. Rep. of Germany

[21] Appl. No.: 561,876

[22] Filed: Dec. 15, 1983

[30] Foreign Application Priority Data

Dec. 17, 1982 [DE] Fed. Rep. of Germany ....... 3246759

[51] Int. Cl.$^4$ .............................................. B65G 47/26
[52] U.S. Cl. .......................................... 198/456; 17/63
[58] Field of Search ............................. 198/456; 17/63

[56] References Cited

U.S. PATENT DOCUMENTS 4,321,729 3/1982 Ollik ........................................ 17/63
4,463,478 8/1984 Hartmann et al. ..................... 17/63

FOREIGN PATENT DOCUMENTS 1160148 12/1963 Fed. Rep. of Germany ...... 198/456
2619217 2/1977 Fed. Rep. of Germany .
3111567 10/1982 Fed. Rep. of Germany .

Primary Examiner—Joseph E. Valenza
Assistant Examiner—Michael Stone
Attorney, Agent, or Firm—Thomas R. Morrison

[57] ABSTRACT

The object of the invention is to enable the mechanical processing in the usual manner without presorting, of fish caught in drift or stationary nets, a very high percentage of these fish thus being damaged at their heads. This is made possible in that the fish placed in troughs of a conveyor transverse to their longitudinal axis come into operational relationship on their path of conveyance with a circumferential surface of a driven rotational body moved to swing in the axial direction of the fish. Therein the head of the fish enters the wedge formed between a support surface of the conveyor and the circumferential surface of the rotational body so that the circumferential surface comes into contact with a head flank of the fish. By limiting the swinging movement of the rotational body by placing a thickness sensing element operationally related to a rotational body onto the fish the desired positioning for a beheading of the same is achieved.

6 Claims, 4 Drawing Figures

METHOD AND DEVICE FOR ALIGNING FISH

BACKGROUND OF THE INVENTION

1. Field of the Invention

The invention relates to a method for aligning fish with relation to the position of the edges of their gill covers or their shoulder girdle arcs facing the rump by displacing the fish and holding the same in the aligned position, and to a device for carrying out this method comprising a conveyor moving the fish transversely to their longitudinal axis and equipped with conveying chambers defining a support surface for the fish and being separated from each other by means of lateral limiting elements extending transverse to the conveying direction, and a displacement device for displacing the fish within the conveying chambers, the displacement device comprising a displacing element entering between the lateral limiting elements of and in time with the conveying chambers guided past the displacement device and a braking element which comes into contact with the flank of each fish and is operationally related to the displacing element.

2. Description of Prior Art

In commercial fishing set or stationary nets and drift nets are being more and more frequently used in view of increasing prices, especially in the area of energy supply. Besides the improvement in the economy of these catching methods another advantage thus comes into effect which lies in that these nets effect a better selection of size in contrast to trawl or draw nets. This effect is due to the fact that in a set net or a drift net only such fish are retained which are caught with their gill covers in the meshes of the same due to their size, while smaller fish can swim through without hinderance. In contrast, thereto it is unavoidable with a trawl net that the exit for smaller fish is closed with increasing filling of the net, since the bodies of the fish already caught lie transversely obstructing the meshes.

In contrast to the represented advantages of set and drift nets which thus prove to be helpful in endeavours to ensure the continued existence of the fish species forming the basis of human nutrition with fish protein there is the fact that a relatively large number of fish thus caught are damaged at their heads. The reason for this is that the fish, after such nets have been hauled in, must be picked or shaken out of the meshes, the result of which is that the gills and sometimes also the lower jaws are ripped off. Fish so damaged cannot be processed mechanically in a conventional way since usually the measuring and adjusting means of these processing machines start in the area of the head in order to adjust the position of each fish optimally, e.g. for the beheading.

Such means can be taken e.g. from German Pat. No. 26 19 217. This device shows a trough conveyor conveying the fish to be processed transverse to their longitudinal axis. An aligning plate is arranged beside the trough conveyor and running with the same and is equipped with head pressers which engage at the head end of the fish and yield resiliently. The speeds are so coordinated that the head pressers accompany the fish passing by and effect a displacement of the same. A brake shoe which can be lowered onto each fish via operational relationship with the aligning plate according to the timing of the troughs is moved in such a way that the displacement movement of a large fish is stopped earlier and that of a small fish, later. The coordination in this is such that each fish, independent of its size, takes a position which enables an economical beheading cut.

Further a device can be taken from DE-OS No. 31 11 567 in which fish conveyed placed on their belly in troughs of an intermittently driven trough conveyor are adjusted into an optimal beheading position independent of their size. The device consists of a feeler which can be lowered onto the back of the fish during the stationary period of the trough conveyor, which feeler is in operational relationship with a pushing element engaging the head end of the fish. Therein the operational relationship is such that the positioning by displacement is ended when the feeler comes into contact with the back of the fish.

The exact positioning of fish damaged at their heads is not possible with the prior art devices. Since the damages described at the beginning have a certain uniformity it is possible to coordinate the known device accordingly. It is not, however, possible to account for the fact that damaged as well as undamaged fish reach processing randomly.

OBJECT OF THE INVENTION

It is therefore the object of the invention to suggest a possibility enabling a mechanical processing in a conventional manner without sorting the catch of fish caught in drift or set nets.

The object is achieved according to the invention by a method for aligning fish with relation to the position of the edges of their gill covers or their shoulder girdle arcs facing the rump by displacing the fish and holding the same in the aligned position, wherein the displacement of the fish occurs by engaging at least one of their head flanks.

SUMMARY OF THE INVENTION

The above object is further achieved according to the invention by a device comprising a conzveyor moving the fish transversely to their longitudinal axis and equipped with conveying chambers defining a support surface for the fish and being separated from each other by means of lateral limiting elements extending transverse to the conveying direction, and a displacement device for displacing the fish within the conveying chambers, the displacement device comprising a displacing element entering between the lateral limiting elements of and in time with the conveying chambers guided past the displacement device and a braking element which comes into contact with the flank of each fish and is operationally related to the displacing element, in which device the displacing element comprises a driven body of revolution which rotates around a first axis extending essentially parallel to the conveying direction of the conveyor beside the latter, the axis being arranged on an oscillating crank which is pivotable about a second axis extending essentially parallel to the first axis, and wherein a circumferential surface defined by the body of revolution is arranged at a small distance above the support surface and to move against the fish.

The advantages achieved by the invention consist essentially in an improvement in the reliability of the processes for treating fish damaged at their heads and of respective processing machines which have a high throughput rate, thus obtaining an improvement in the processing economy as a whole.

Preferably a cam disc advantageously running coaxial with the body of revolution can be provided for timing the displacement device, which cam disc bears against a supporting roller by the force of a spring. An adaptation of the displacement device to each fish to be processed can be enabled in an advantageous manner in that the operational relationship between the displacing element and the brake element is formed by a lever mechanism whose lever ratio is adjustable.

The application of the device according to the invention in fish processing machines with a continuously driven conveyor is possible if the circumferential surface of the body of revolution or rotational body is formed cylindrically and in the form of a helix whose pitch or gradient corresponds to the pitch or spacing of the conveying chambers of the conveyor and whose width measured parallelly to the first axis is smaller than the width of the support surface of the fish in the conveying chambers, and if the revolutions of the body of revolution/rotational body correspond to the pulse or timing of the conveying chambers moved by the conveyor.

A modification serving the same purpose is characterised in that the body of revolution/rotational body comprises a cylinder segment whose rotation is superimposed by a reversing axial movement of such a type that the cylinder segment, during the phase of its penetration between the lateral limiting elements of the conveying chambers, experiences a displacement corresponding to the advancing of the chambers.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

DETAILED DESCRIPTION OF THE PREFERRED EMBODIMENT

Figure 1:
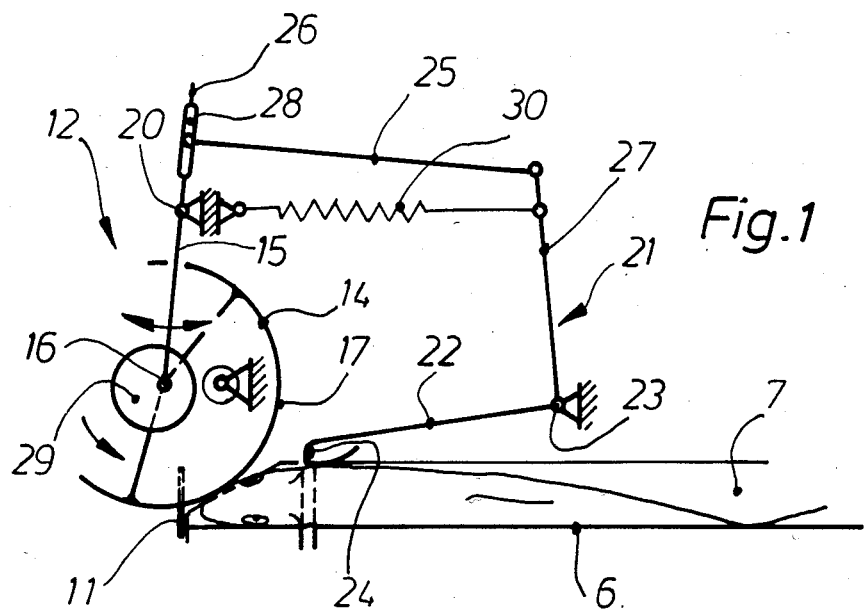
FIG. 1 shows a simplified side view of the device for realizing the invention.
Figure 2:
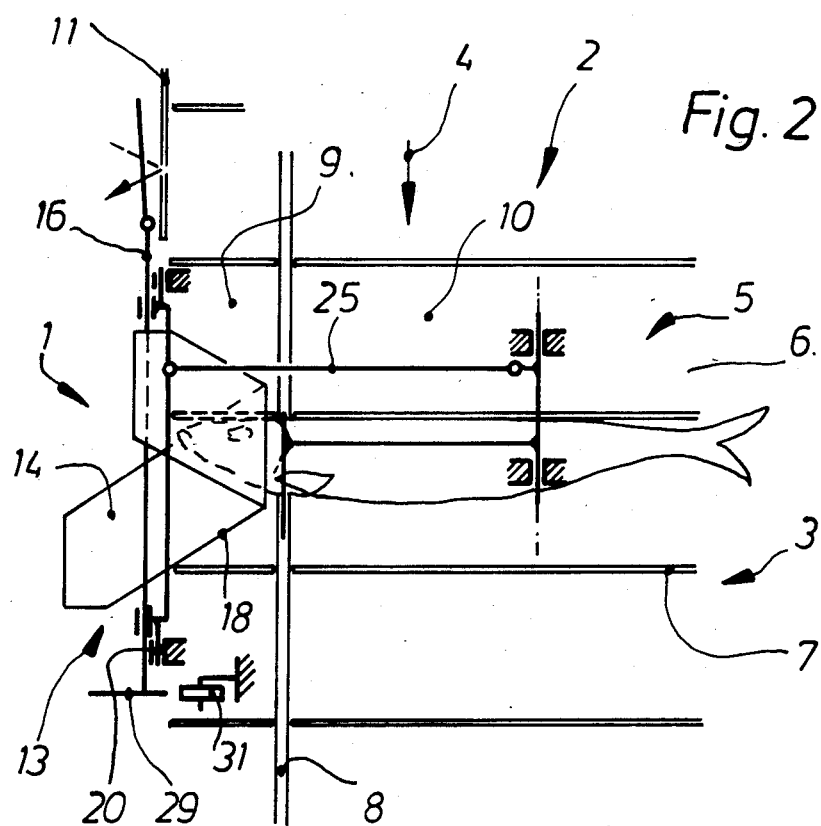
FIG. 2 shows a top view of the device of FIG. 1.

In a machine for fish not shown in detail, e.g. a decapitating and filletting machine with a processing station 1 and a feeding area 2 positioned in front thereof and, only vaguely shown, a conveyor 3 driven endlessly corresponding to an arrow of direction 4 and only hinted at is arranged. The conveyor 3 has conveying chambers 5 which are limited by limiting walls 7 extending upwardly from a support surface 6. Both the support surface 6 and the limiting walls 7 are provided with a slot 8 which extends parallel to the arrow 4 and divides the conveying chamber 5 into a head chamber 9 and a rump chamber 10 with a ratio of about one to four. In the feeding area 2 the head chambers 9 are covered frontally by a head bar 11 attached to the machine. Preferably the support surfaces 6 are arranged to ascend slightly from the head bar 11 in order to create a certain component of gravity of the fish in the direction towards the head bar 11. The processing station 1 comprises a displacement device 12 and e.g. a not-shown cutting device for removing the heads of fish and which penetrates the slot 8. The displacement device 12 is arranged above the conveyor 3 and the support surface 6. It comprises essentially a displacing element 13 which is formed in a suitable manner as a body of revolution or rotational body 14 driven in a timed manner with the conveying chambers 5 moved by the conveyor 3. The rotational body 14 rotates about a first axis 16 arranged parallel to the conveying direction of the conveyor 3 and attached to a swinging or oscillating crank 15 and comprises, according to the embodiment of FIGS. 1 and 2, a helix 18 which forms part of a cylindrical circumferential surface 17 whose pitch or gradient corresponds to the spacing of the conveying chambers 5 and whose width, i.e. the respective surface width of the helix elements, when measured parallel to the first axis 16, is smaller than the width of the support surface 6 of the fish in the conveying chambers 5. The oscillating crank 15 which carries the axis 16 of the rotational body 14 and is formed as a two-armed lever is mounted pivotally about a second axis 20 which is mounted approximately above the front side end of the head chambers 9 and parallel to the arrow 4. The oscillating crank 15 is in operational relationship with a brake element 21. This comprises a sensing lever 22 formed as an angle lever which is mounted pivotally about an axis 23 attached to the machine above the rump chambers 10 parallel to the conveying direction 4 of the conveyor 3. A sensing plate 24 provided with a sensing edge is positioned at the end of that part of the sensing lever 22 which reaches above the rump chambers 10, which plate is positioned in the plane of the slot 8. The operational relationship between the displacing element 13 and the brake element 21 occurs by means of a lever 25 which connects a free arm 26 of the two-armed lever forming the oscillating crank 15 in an articulated manner to a free arm 27 of the sensing lever 22. The lever ratio of the lever mechanism is adjustable by an oblong hole attachment 28 on the arm 26. A cam disc 29 is arranged on the first axis 16 of the rotational body 14, rotates therewith and supports itself by the force of a spring 30 against a supporting roller 31 attached to the machine.

A variation of the displacement device 12 provides a cylinder segment 32 as a rotational body, which segment rotates about an axis 33 corresponding to the first axis 16, which axis 33 carries an axial cam 35 as well as a cam roller 34 corresponding to the cam disc 29, which axial cam supports itself by the force of a not-shown axial spring against a supporting roller 36.

The method of operation of the device is the following:

The fish to be processed arrive either manually or by corresponding feeding devices between the lateral limiting walls 7 of the conveying chamber 5 in such a manner that the heads in the head chamber 9 come to rest lying against the head bar 11. The fish are supplied to the displacement device 12 so that they can each enter its area when the cam disc 29 supports itself by its largest radius on the supporting roller 31. During the further conveying the circumferential surface 17 of the rotational body 14 approaches the fish due to the course of the cam disc 29 on the supporting roller 31 and finally gets into contact with the head flank of the fish which is present in the form of the head skeleton, even when the gill cover and the lower jaw have been ripped off. Due to the rotating movement of the helix 18 forming the circumferential surface 17 of the rotational body 14 the circumferential surface 17 accompanies the fish with which it is in contact and shoves it back into the conveying chamber 5 due to the increasing course of the cam disc 29. This process continues until the sensing lever 22 connected to the oscillating crank 15 via the guiding lever 25 contacts the fish with the edge of its sensing plate 24. If the lever ratio of the lever mechanism has been adjusted properly then this occurs when the edge of the gill cover or the edge of the shoulder girdle has come to rest directly next to the edge of the sensing plate 24. The shoving process is ended when the latter touches the fish so that the cam disc 29 and the supporting roller 31 get out of contact. In this way the fish is in a position which enables an economical beheading.

Figure 3:
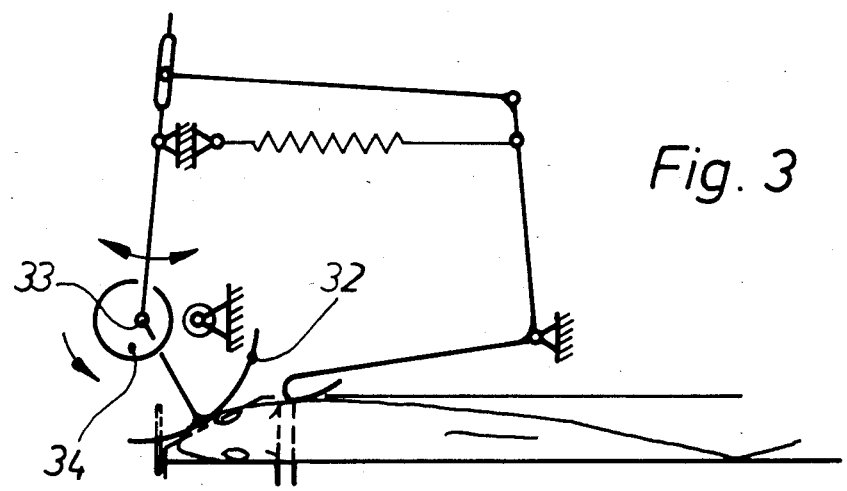
FIG. 3 shows a top view of a modified device.
Figure 4:
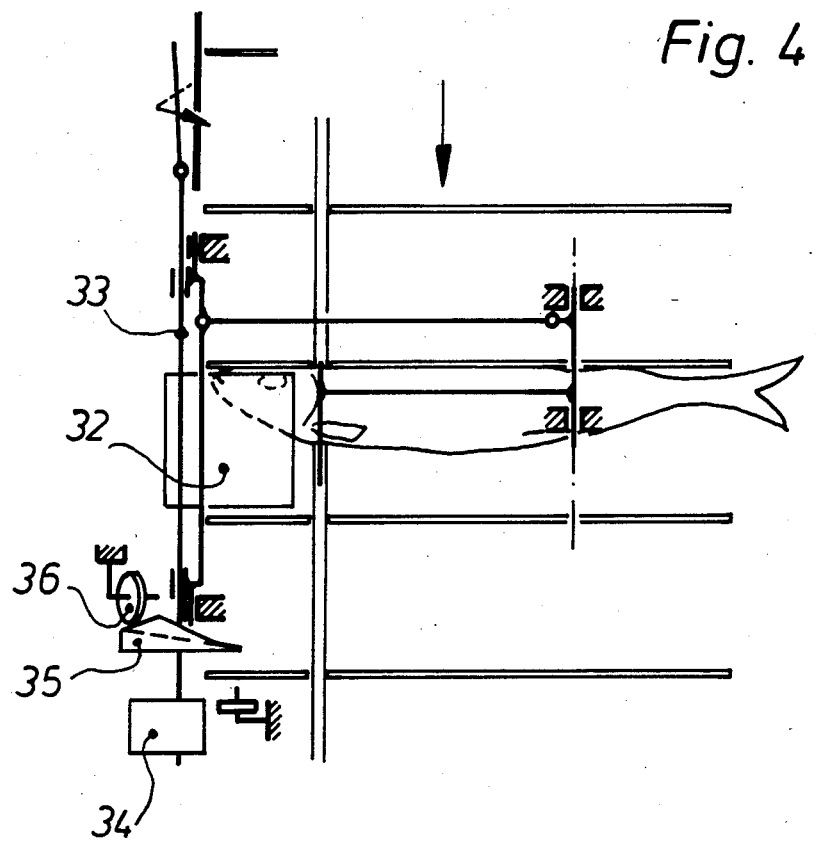
FIG. 4 shows a top view of the device of FIG. 3.

In the displacement device 12 of FIGS. 3 and 4 the accompanying movement of the circumferential surface 17 of the rotational body which gets in contact with the fish is effected by the movement of course of the axial cam 35. This enables the designing of the rotational body as cylinder segment 32 which penetrates between the limiting walls 7. The cam roller 34 controlling the oscillating crank 15 is so synchronised with the axial cam 35 that a guiding back of the cylinder segment 35 against the conveying direction of the conveyor 3 occurs when the cylinder segment 32 is outside the conveying chambers 5.

I claim:

1. A device for aligning fish having a head including head flanks and a rump, said rump defining a longitudinal axis of said fish, said device comprising conveyor means moving said fish transversely to said longitudinal axis in a conveying direction and equipped with conveying chamber means defining support surface means for said fish and being separated from each other by means of lateral limiting elements extending transversely to said conveying direction, and further comprising displacement means for displacing said fish within said conveying chamber means, said displacement means comprising a displacing element entering between said lateral limiting elements of and in time with said conveying chamber means guided past said displacement means and a braking element which comes into contact with one of said flanks of each of said fish and is in operable relationship with said displacing means, wherein said displacing element comprises driven rotational body means which rotate around said first axis means extending essentially parallel to said conveying direction of said conveyor means besides the latter, said first axis means being arranged on oscillating crank means which are pivotable about second axis means extending essentially parallel to said first axis means, wherein circumferential surface means defined by said rotational body means are arranged at a small distance above said support surface means and to move against said fish, and wherein cam disc means running coaxial with said rotational body means are provided for timing said said displacement means, which cam disc means resiliently bear against supporting roller means.

2. A device as claimed in claim 1, wherein said operational relationship between said displacing means and said brake element is formed by lever mechanism means whose lever ratio is adjustable.

3. A device as claimed in claim 1, wherein said circumferential surface means are formed cylindrically and in the form of a helix whose pitch corresponds to a pitch defined by said conveying chamber means and whose width measured parallelly to said first axis means is smaller than the width of said support surface means defined between said lateral limiting elements in said conveying chamber means, and wherein the number of revolutions of said rotational body means corresponds to the timing of said conveying chamber means moved by said conveyor means.

4. A device for aligning fish having a head including head flanks and a rump, said rump defining a longitudinal axis of said fish, said device comprising conveyor means moving said fish transversely to said longitudinal axis in a conveying direction and equipped with conveying chamber means defining support surface means for said fish and being separated from each other by means of lateral limiting elements extending transversely to said conveying direction, and further comprising displacement means for displacing said fish within said conveying chamber means, said displacement means comprising a displacing element entering between said lateral limiting elements of and in time with said conveying chamber means guided past said displacement means and a braking element which comes into contact with one of said flanks of each of said fish and is in operational relationship with said displacing means, wherein said displacing element comprises driven rotational body means which rotate around first axis means extending essentially parallel to said conveying direction of said conveyor means beside the latter, said first axis means being arranged on oscillating crank means which are pivotable about second axis means extending essentially parallel to said first axis means, wherein circumferential surface means defined by said rotational body means are arranged at a small distance above said support surface means and to move against said fish, and wherein said rotational body means comprise rotating cylinder segment means whose rotation is superimposed by a reversing axial movement of such a type that said cylinder segment means, during the phase of a penetration between said lateral limiting elements of said conveying chamber means, experience a displacement according to the movement of progression of the same.

5. A device as claimed in claim 1, wherein said rotational body means comprise rotating cylinder segment means whose rotation is superimposed by a reversing axial movement of such a type that said cylinder segment means, during the phase of a penetration between said lateral limiting elements of said conveying chamber means, experience a displacement according to the movement of progression of the same.

6. A device as claimed in claim 4, wherein said operational relationship between said displacing means and said brake element is formed by lever mechanism means whose lever ratio is adjustable.

* * * * *